United States Patent
Parks et al.

(10) Patent No.: US 12,032,852 B2
(45) Date of Patent: Jul. 9, 2024

(54) MANAGING DISPLAY DATA

(71) Applicant: DisplayLink (UK) Limited, Cambridge (GB)

(72) Inventors: Matthew Parks, Cambridge (GB); Peter Skan, Harpenden (GB)

(73) Assignee: DisplayLink (UK) Limited, Cambridge (GB)

( * ) Notice: Subject to any disclaimer, the term of this patent is extended or adjusted under 35 U.S.C. 154(b) by 32 days.

(21) Appl. No.: 17/790,953

(22) PCT Filed: Jan. 6, 2021

(86) PCT No.: PCT/GB2021/050028
§ 371 (c)(1),
(2) Date: Jul. 5, 2022

(87) PCT Pub. No.: WO2021/140324
PCT Pub. Date: Jul. 15, 2021

(65) Prior Publication Data
US 2023/0039975 A1    Feb. 9, 2023

(30) Foreign Application Priority Data

Jan. 6, 2020 (GB) ..................................... 2000127

(51) Int. Cl.
*G06F 3/06* (2006.01)

(52) U.S. Cl.
CPC ............ *G06F 3/0656* (2013.01); *G06F 3/061* (2013.01); *G06F 3/0671* (2013.01)

(58) Field of Classification Search
CPC ......... G06F 3/0656; G06F 3/61; G06F 3/0671
See application file for complete search history.

(56) References Cited

U.S. PATENT DOCUMENTS

| | | | |
|---|---|---|---|
| 8,665,282 B2 * | 3/2014 | Tanaka | G09G 5/399 345/536 |
| 10,062,142 B2 * | 8/2018 | Shah | G06T 1/60 |

(Continued)

FOREIGN PATENT DOCUMENTS

| | | |
|---|---|---|
| EP | 0391584 A2 | 10/1990 |
| JP | 2001125548 A1 | 5/2001 |
| WO | 2006113905 A2 | 10/2006 |

OTHER PUBLICATIONS

Examination Report from GB application No. GB2000127.7 dated Nov. 16, 2022.

(Continued)

*Primary Examiner* — Henry Tsai
*Assistant Examiner* — Christopher A Daley
(74) *Attorney, Agent, or Firm* — Paradice & Li LLP

(57) ABSTRACT

Disclosed herein is a method of writing data to, and reading data from, one or more buffers. The method comprises: determining a write rate of writing data into a first buffer; determining a read rate of reading data from the first buffer; determining, using the write rate and the read rate, a portion of the first buffer; writing data into the portion of the first buffer; starting to read data from the first buffer when the writing of data to the portion of the first buffer has finished; and writing data into a remaining part of the first buffer, different from the portion of the first buffer. The portion of the first buffer is determined such that the reading of data from the first buffer does not overtake the writing of data into the first buffer.

16 Claims, 11 Drawing Sheets

(56) References Cited

U.S. PATENT DOCUMENTS

| | | | | |
|---|---|---|---|---|
| 10,803,785 B2* | 10/2020 | Hong | ............... | G09G 3/2096 |
| 2004/0135789 A1* | 7/2004 | Yu | ............... | G09G 5/399 |
| | | | | 345/531 |
| 2010/0265260 A1* | 10/2010 | Swic | ............... | G09G 5/399 |
| | | | | 345/539 |
| 2015/0130824 A1* | 5/2015 | Lee | ............... | G09G 3/20 |
| | | | | 345/534 |
| 2015/0235343 A1* | 8/2015 | Asai | ............... | G09G 5/001 |
| | | | | 345/534 |
| 2016/0109934 A1* | 4/2016 | Woo | ............... | G06F 1/3265 |
| | | | | 345/211 |
| 2019/0045088 A1* | 2/2019 | Ansari | ............... | G09G 5/12 |

OTHER PUBLICATIONS

International Search Report and Written Opinion, dated Feb. 9, 2021, from PCT Application No. PCT/GB2021/050028, 10 pages.

\* cited by examiner

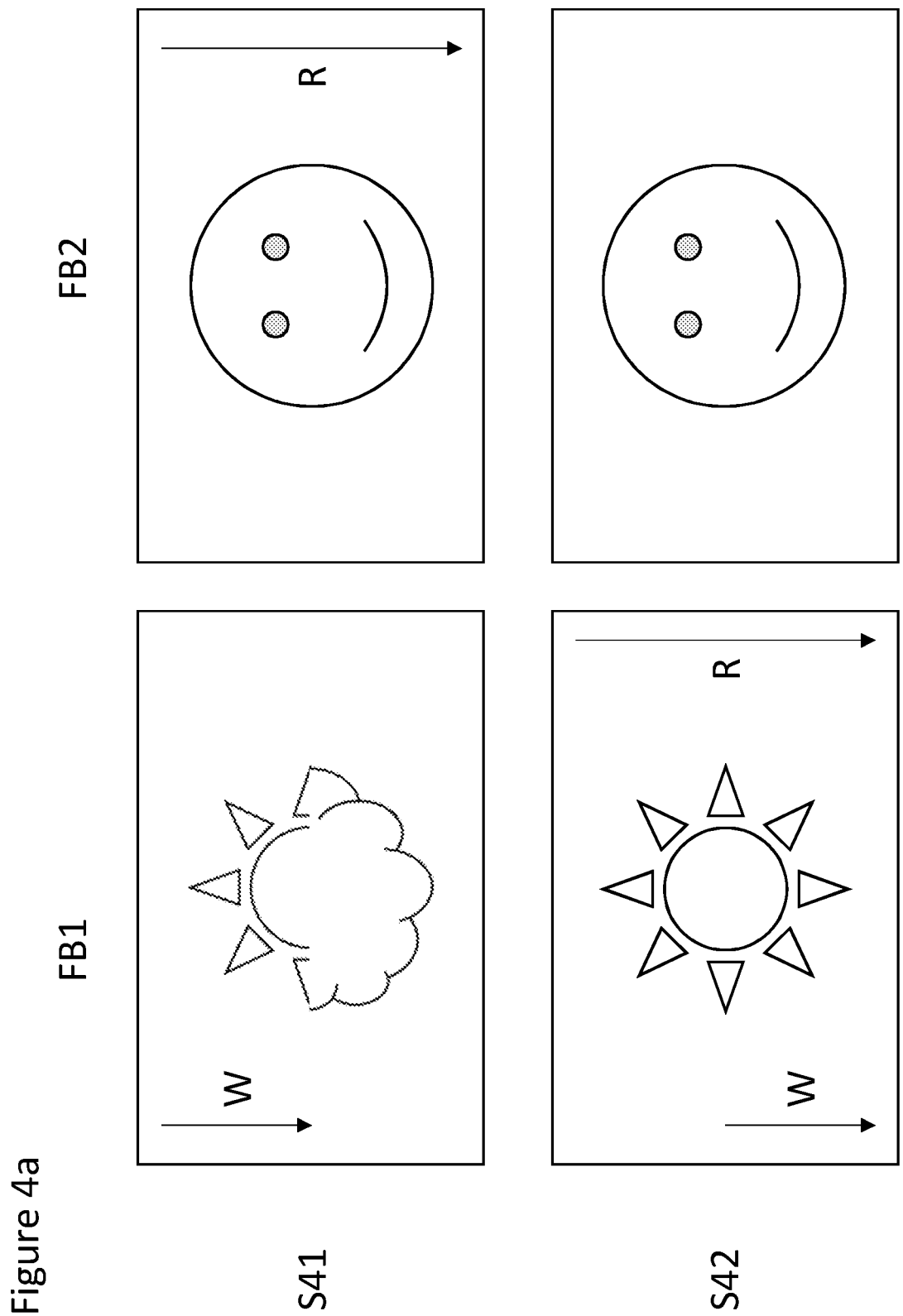

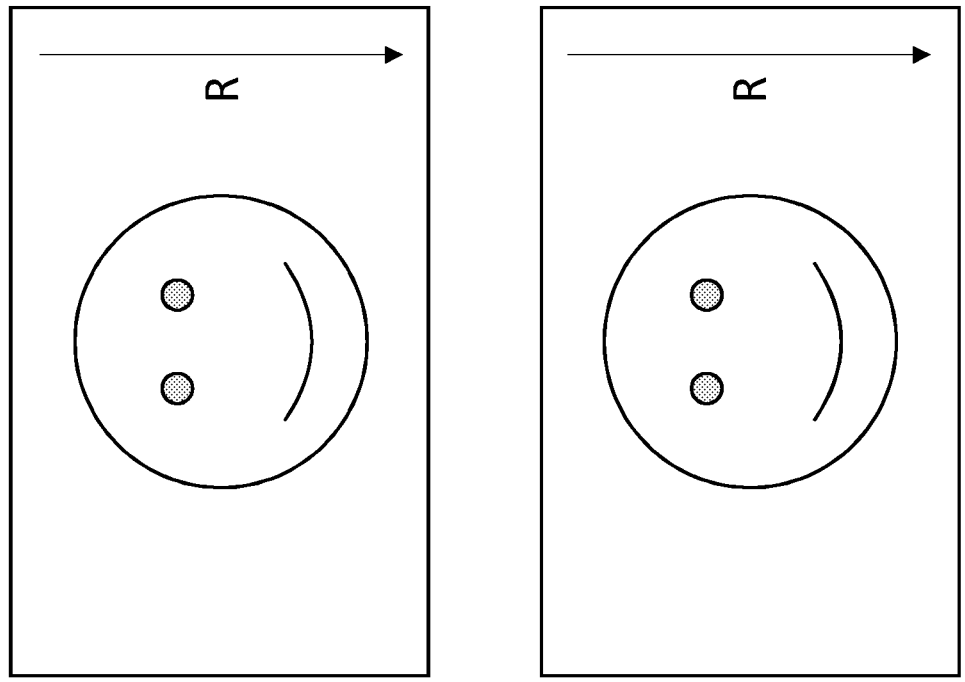
Figure 5a
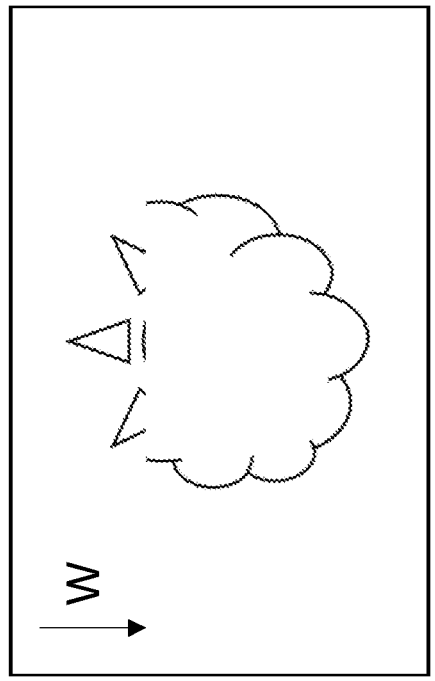
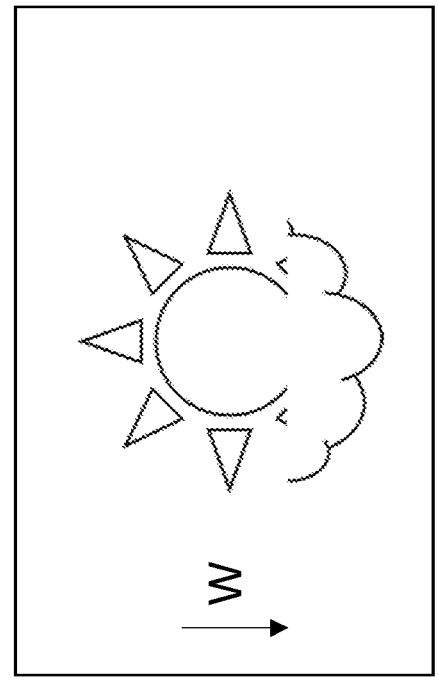

S53

S54

MANAGING DISPLAY DATA

CROSS REFERENCE TO RELATED APPLICATIONS

This application is a National Stage Entry filed under 35 U.S.C. 371 of PCT/GB2021/050028, filed Jan. 6, 2021, which claims priority to Great Britain Application No. 2000127.7, filed Jan. 6, 2020, all of which are assigned to the assignee hereof. The disclosures of all prior Applications are considered part of and are incorporated by reference in this Patent Application.

BACKGROUND

This disclosure relates, generally, to managing data, for example display data. In many computing systems, especially display systems, it is common to stream data through a buffer: i.e. for one process to write data into the buffer and a second process to read the data. The read and write processes ideally traverse the data as close together in time as possible such that there is as small a delay as possible between a specific datum being written and being read, and ideally this time delay is constant. However, it is common for read processes to be faster than write processes, which can result in the processes losing synchronisation and possibly the read process attempting to read data that has not been written. It will be apparent that a buffer may well have previously written data stored in it, or may be at least partly empty (no data, which is not the same as data that is zero). When a buffer is written to, the write process overwrites what was previously there, whether no data, or previously written data. Similarly, when a buffer is read, the read process reads whatever data (or no data) it comes to, whether that data has been written in the current writing process or has been written previously.

In the case of a display system, it is common for the loss of synchronisation to be mitigated by the use of multiple buffers such that one buffer is written while the other is read, and a read process can only begin on a particular buffer once the write process has finished. Commonly, three buffers are provided in order to ensure that there will be no overlap, and once the write process has finished writing data to a given buffer it sets a flag indicating which buffer it will write to next. When the read process reaches the end of a given buffer it proceeds to the next buffer, according to the flag. However, this results in increased and unpredictable latency since an entire frame of display data must be written before the directional flag can be set, followed by an unknown length of time for the read process to catch up, ranging from immediate to the time it takes to read an entire frame.

These increased and unpredictable delays are unacceptable in display and other streaming systems, especially as technology improves and delays in updates become more noticeable to the user.

SUMMARY

Aspects of the present disclosure are set out in the independent claims and preferred features are set out in the dependent claims.

In a first aspect, a method of writing data to, and reading data from, one or more buffers may include:
determining a write rate of writing data into a first buffer;
determining a read rate of reading data from the first buffer;
determining, using the write rate and the read rate, a portion of the first buffer;
writing data into the portion of the first buffer;
starting to read data from the first buffer when the writing of data to the portion of the first buffer has finished; and
writing data into a remaining part of the first buffer, different from the portion of the first buffer;
wherein the portion of the first buffer is determined such that the reading of data from the first buffer does not overtake the writing of data into the first buffer.

The first buffer may be a first-in first-out, FIFO, buffer.

The method may further include:
determining a write rate of writing data into a second buffer;
determining a read rate of reading data from the second buffer;
determining, using the write rate and the read rate, a portion of the second buffer;
writing data into the portion of the second buffer when the writing of data to the remaining part of the first buffer has finished;
continuing to read data from the first buffer whilst data is written to the portion of the second buffer;
starting to read data from the second buffer when the writing of data to the portion of the second buffer is finished; and
writing data into a remaining part of the second buffer, different from the portion of the second buffer;
wherein the portion of the second buffer is determined such that the reading of data from the second buffer does not overtake the writing of data into the second buffer.

The second buffer may be a first-in first-out, FIFO, buffer.

The step of determining the portion of the second buffer may be based on a ratio of the read rate of reading data from the second buffer and the write rate of writing data to the second buffer.

The step of determining the portion of the first buffer may be based on a ratio of the read rate of reading data from the first buffer and the write rate of writing data to the first buffer.

The portion of the first buffer may be calculated using the formula:

$$P = B\left(1 - \frac{1}{R}\right)$$

where P is the portion, B is the size of the first buffer, and R is the read rate of reading data from the first buffer divided by the write rate of writing data to the first buffer.

The portion of the first buffer may be calculated using the formula:

$$P = B\left(1 - \frac{1}{R}\right) + C$$

where P is the portion, B is the buffer size of the first buffer, R is the read rate of reading data from the first buffer divided by the write rate of writing data to the first buffer, and C is a constant.

In one example, only updated parts of the first buffer are written to.

In a second aspect, a method of writing data to, and reading data from, a buffer may include:

determining a write rate of writing data into the buffer;
determining a read rate of reading data from the buffer;
writing data into the buffer;
determining, using the write rate and the read rate, a time at which data is to begin to be read from the buffer, wherein the time is determined such that the reading of data from the buffer will not overtake the writing of data into the buffer; and
starting to read data from the buffer at the determined time.

The buffer may be a first-in first-out, FIFO, buffer.

In one example, only updated parts of the buffer are written to; and the time at which data is to begin to be read from the buffer is calculated based on the time at which the writing of the updated parts to the buffer will be complete.

In one example, all of the data in the buffer is read.

The data may be display data. The data may include tiles of display data.

In a third aspect, a computing device may include a plurality of frame buffers, wherein the computing device is configured to perform the method according to the first aspect or the second aspect.

In a fourth aspect, a system may include:
a non-transitory memory storing instructions; and
one or more hardware processors coupled to the non-transitory memory and configured to execute the instructions from the non-transitory memory to cause the system to perform operations including:
determining a write rate of writing data into a first buffer;
determining a read rate of reading data from the first buffer;
determining, using the write rate and the read rate, a portion of the first buffer;
writing data into the portion of the first buffer;
starting to read data from the first buffer when the writing of data to the portion of the first buffer has finished; and
writing data into a remaining part of the first buffer, different from the portion of the first buffer;
wherein the portion of the first buffer is determined such that the reading of data from the first buffer does not overtake the writing of data into the first buffer.

In a fifth aspect, a system may include:
a non-transitory memory storing instructions; and
one or more hardware processors coupled to the non-transitory memory and configured to execute the instructions from the non-transitory memory to cause the system to perform operations including: determining a write rate of writing data into a buffer;
determining a read rate of reading data from the buffer;
writing data into the buffer;
determining, using the write rate and the read rate, a time at which data is to begin to be read from the buffer, wherein the time is determined such that the reading of data from the buffer will not overtake the writing of data into the first buffer; and
starting to read data from the first buffer at the determined time.

In one example, a method of streaming data through a pair of buffers may include:
1. Determining relative rates of a write process and a read process (the Ratio);
2. Determining a portion of each buffer based on the Ratio (the Portion);
3. The write process writing data into a first buffer up to the end of the Portion;
4. The read process receiving a switch signal and beginning to read the first buffer;
5. The read process reading the first buffer repeatedly until it receives a further switch signal;
6. When the write process has written data into the whole of the first buffer, the write process writing data into the second buffer up to the end of the Portion;
7. The read process receiving a further switch signal and beginning to read the second buffer; and
8. When the write process has written data into the whole of the second buffer, the process returning to step 3 above.

Steps 3-8 are repeated until the data stream is complete.

This method is beneficial because it co-ordinates the write and read processes based on the relative time each takes to write data to and read it from the buffers, respectively. Since the read process in a particular buffer begins as soon as enough data has been written to the buffer, there is a reduced delay before the data can be streamed to an endpoint, but because the readiness of the data is determined based on the relative rates of the write and read process the chance of out-of-date data being read is beneficially reduced.

This method can be used in any streaming system but is advantageously used where the data is display data and each of the two buffers are frame buffers.

The Ratio is advantageously determined by a formula:

$$\text{Ratio} = \frac{\text{Time to Write Buffer}}{\text{Time to Read Buffer}}$$

Or alternatively:

$$\text{Ratio} = \frac{\text{Rate of Read Process}}{\text{Rate of Write Process}}$$

Which gives the same result for the Ratio since the time required for a process and the rate of the process are inversely proportional, such that a process which proceeds at a rate of 2× will take half the time of a process that proceeds at a rate of x.

Therefore, the Portion can therefore be determined by a second formula:

$$\text{Portion} = \text{Buffer Size}\left(1 - \frac{1}{\text{Ratio}}\right)$$

This formula can advantageously be amended to allow an offset to the Portion to be added in order to allow for delays in the write process, such that the write process writes a constant amount beyond the Portion before the signal is sent to the read process.

The Portion and the Buffer Size can be measured in any appropriate unit of measurement. For example:
Data volume in bits, nibbles, bytes, kilobytes, etc.
Number of pixels, tiles, slices, rows, etc.
Physical location in an area of memory It will also be appreciated that the method may include calculating a Proportion of the buffer according to:

$$\text{Proportion} = 1 - \frac{1}{\text{Ratio}}$$

In this case, the method may include calculating, using the proportion, a time at which data may begin to be read from the buffer such that the read process will not overtake the write process.

Any system feature as described herein may also be provided as a method feature, and vice versa. As used herein, means plus function features may be expressed alternatively in terms of their corresponding structure.

Any feature in one aspect of the present disclosure may be applied to other aspects of the disclosure, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the present disclosure can be implemented and/or supplied and/or used independently.

BRIEF DESCRIPTION OF THE DRAWINGS

Embodiments will now be described, by way of example only and with reference to the accompanying drawings, in which.

DETAILED DESCRIPTION OF THE DRAWINGS

Figure 1:
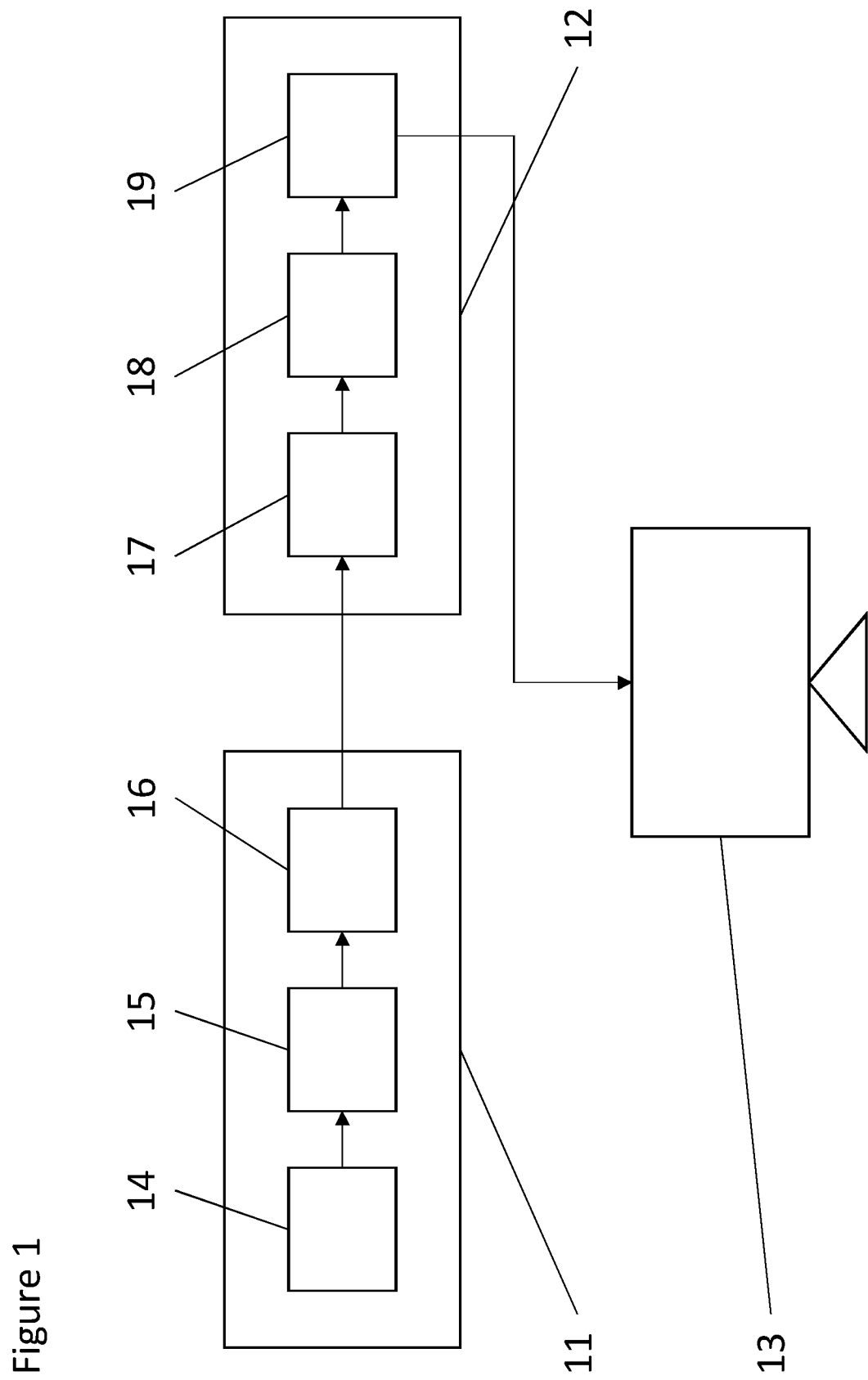
FIG. 1 shows an overview of a display system.

The abbreviations used in the Figures and the equations below are as follows:
W: The write process
R: The read process
T: The time delay between the read and write processes
$T_R$: The time required to read the whole buffer
$T_W$: The time required to write the whole buffer FIG. 1 shows an overview of an example display system. In this example, the system is a display system, including a host computing device [11] which produces and transmits display data, connected to a display control device [12] which prepares the received display data for display and which is connected to a display device [13]. Naturally, this is an example only, and the embodiments of the present disclosure could be used in other streaming contexts, including contexts where the data is transmitted within a single device or where data is received from or transmitted to multiple devices. Accordingly, the connections between the devices and between the components described in this Figure may be over any internal, local, or network interface.

The host computing device [11] incorporates an application [14] which generates a stream of frames of display data, for example as part of a video stream. The application [14] runs in a processor [14] which is connected to an encoder [15]. The encoder [15] compresses the display data in preparation for transmission across a limited-bandwidth connection to the display control device [12]. The encoder [15] may also encrypt the data or carry out any other processing required. The encoder [15] is in turn connected to a frame buffer [16] which stores the data prior to transmission. There may also be a frame buffer between the application [14] and the encoder [15], but it is not shown here.

The display control device [12] incorporates a decoder [17] which reverses the processing carried out by the encoder [15], for example decompression. The decoder [17] is connected to a frame buffer [18] which stores the decoded data before it is sent to the display device [13] for display. Accordingly, this frame buffer [18] is connected to an output engine which transmits the display data to the display device [13]. There may also be a frame buffer which stores the received data before it is decoded, but it is not shown here.

Streaming can be carried out through any of the frame buffers in the system, and any such frame buffer may actually be implemented as two or more frame buffers. For the purposes of this description, streaming takes place through the frame buffer [18] that stores the decoded data before it is sent to the display device [13].

Figure 2:
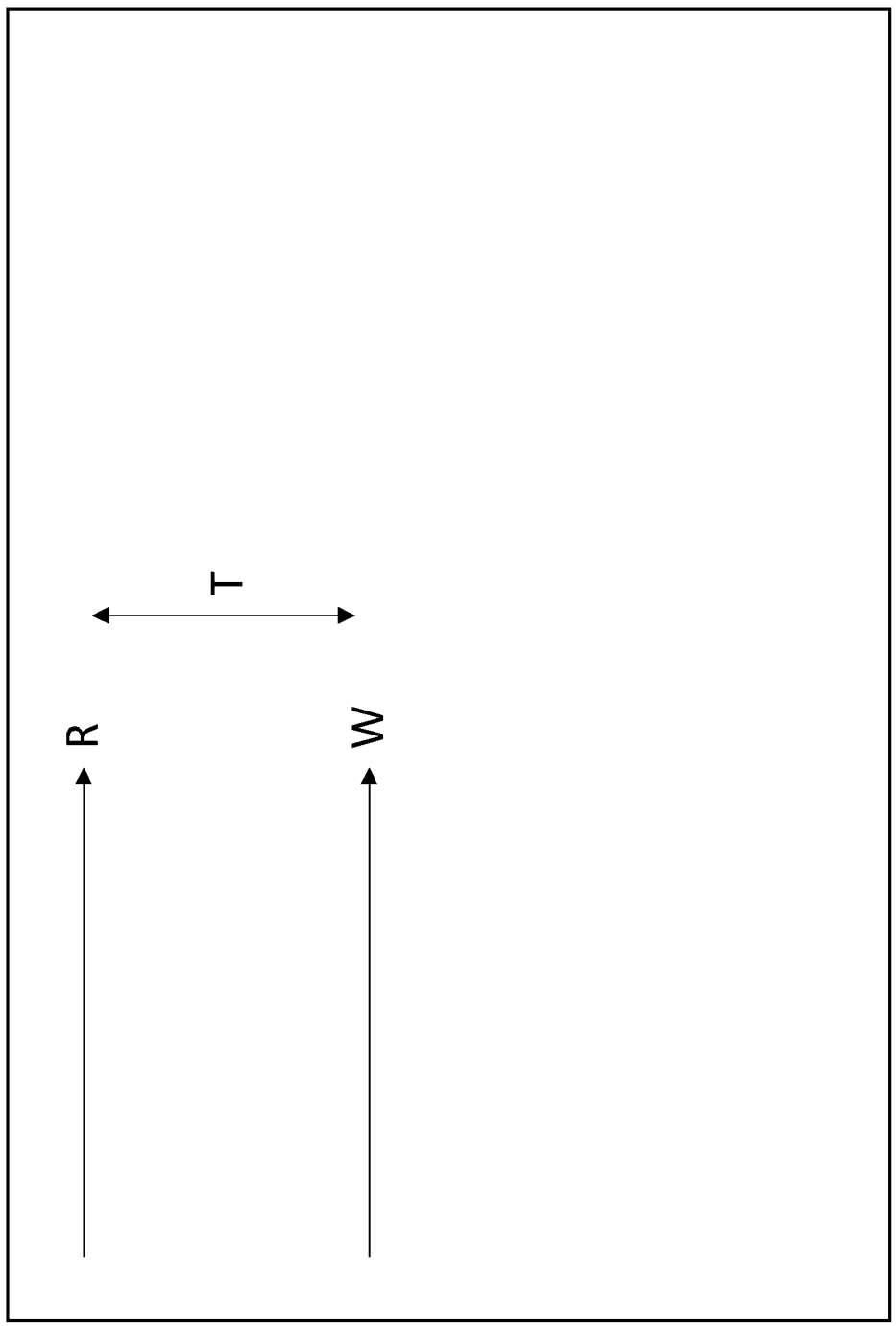
FIG. 2 shows processes interacting with a buffer.

FIG. 2 shows the operation of conventional read and write processes within a single buffer.

The uppermost arrow shown in the Figure represents the read process, and the lower arrow represents the write process. The write process writes data into the buffer and the read process follows behind, reading the data. Ideally, there is a time delay, illustrated by the arrow labelled 'T', between the write and read processes which remains constant and the read process does not overtake the write process. However, if this does occur, the read process may output out-of-date data, which in a display system such as that shown in FIG. 1 may result in visual artefacts such as tearing, and in an audio system may result in audio artefacts such as skipping. The time delay between the write and read processes is added to the overall latency of the system.

In practice, the time delay between the write and read processes cannot be maintained because the read process is commonly faster than the write process.

For example, the time required to read the whole buffer may be half of the time required to write the whole buffer:

$$T_R = \frac{T_W}{2}$$

In this case, if the read and write process begin simultaneously, by the time the buffer has been filled by the write process it would have been read twice.

Figure 3:
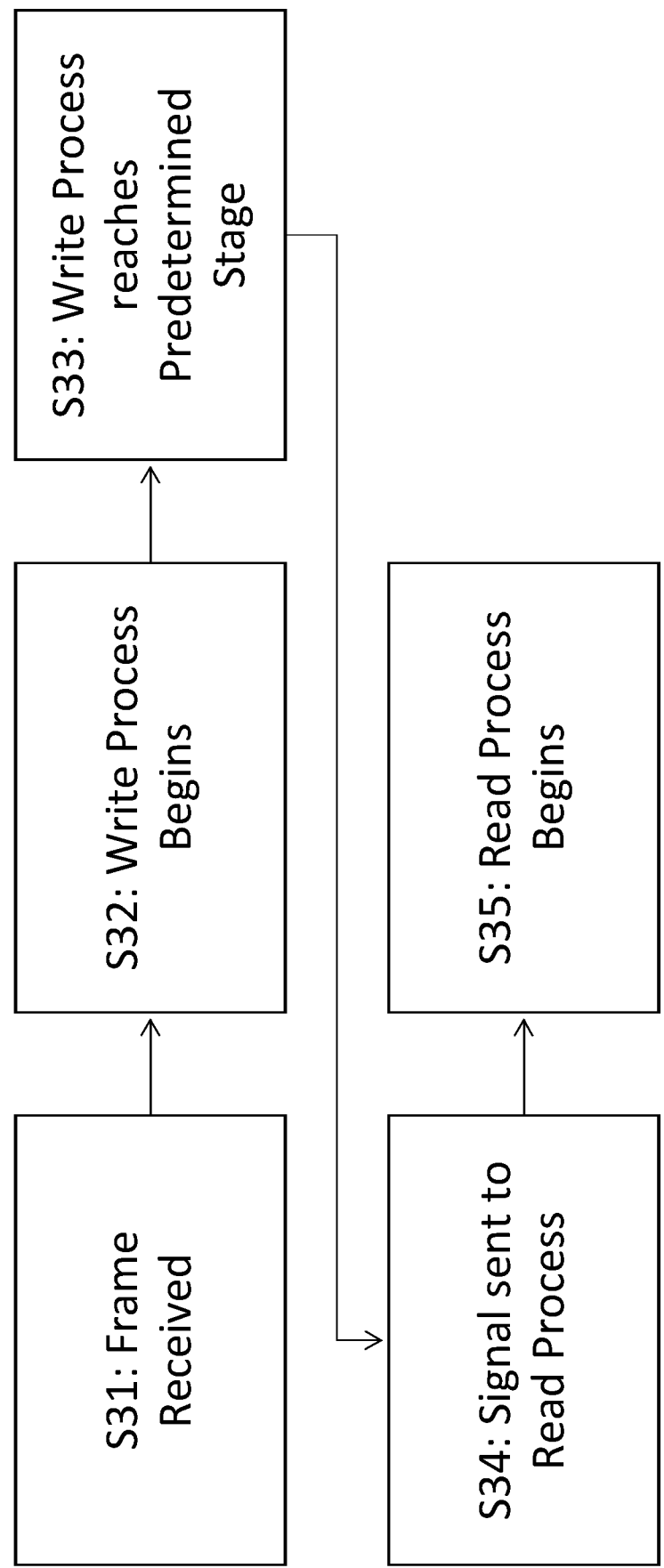
FIG. 3 shows a process.

FIG. 3 shows a process in a display system such as that shown in FIG. 1, assuming the buffer to which the process is applied is the frame buffer [18] connected to the decoder [17] in the display control device [12], which as previously mentioned may be implemented as two or more buffers that may share a single area of memory. This is an example only; similar methods could also be used for the frame buffer [16] connected to the encoder [15] in the host computing device [11], for example.

At Step S31, the decoder [17] receives a frame of display data across the connection from the host computing device [11] and decodes it. It then begins to write the display data into the first frame buffer [18/FB1] at Step S32. When it has written up to a predetermined place in the frame buffer [18/FB1] at Step S33, the decoder [17] sends a signal to the output engine [19] at Step S34 indicating that it should begin the read process, which begins at Step S35.

This process is described again in more detail in FIGS. 4 and 5.

FIG. 4 shows an example in a display system such as that shown in FIG. 1, where $$T_R = \frac{T_W}{2}$$

as mentioned above.

Since the ratio between $T_R$ and $T_W$ is 2:1, the predetermined point mentioned at Step S33 is determined as the point at which the write process has written ½ of the frame into the buffer [18]—i.e. has written ½ of the buffer [18], if the buffer is the same size as a complete frame. Accordingly, in Step S41 shown in FIG. 4a, the write process writes the first half of a new frame—received in a step corresponding to Step S31 but not shown in FIG. 4—into the first frame buffer [18/FB1]. This is shown by the arrow labelled W in the first part of FIG. 4a, as previously described.

If the first frame buffer [18/FB1] were read at this point, the image output would consist of half the new frame (a sun) and half of a previous frame (a cloud). This is an example of tearing. In contrast, in the present example, the read process is delayed; in FIG. 4a it is shown to be reading the second frame buffer [18/FB2] which contains a complete preceding frame (a face), but if the frame being written were the first in the stream the read process might be inactive during Step S41.

When the write process has completed the first half of the frame, a signal is sent to the output engine [19] at Step S34. The output engine [19] then begins to read the first frame buffer [18/FB1] as illustrated at Step S42 by the arrow labelled R. This corresponds to Step S35 in FIG. 3.

While the read process is being carried out on the first frame buffer [18/FB1], the write process continues to write the remainder of the data into the first frame buffer [18/FB1]. This means that by the time the read process has reached the halfway point in the frame buffer [18/FB1], the write process will have reached the three-quarter point and so on, so that the two processes reach the end of the frame together but the read process never overtakes the write process.

Figure 4B:
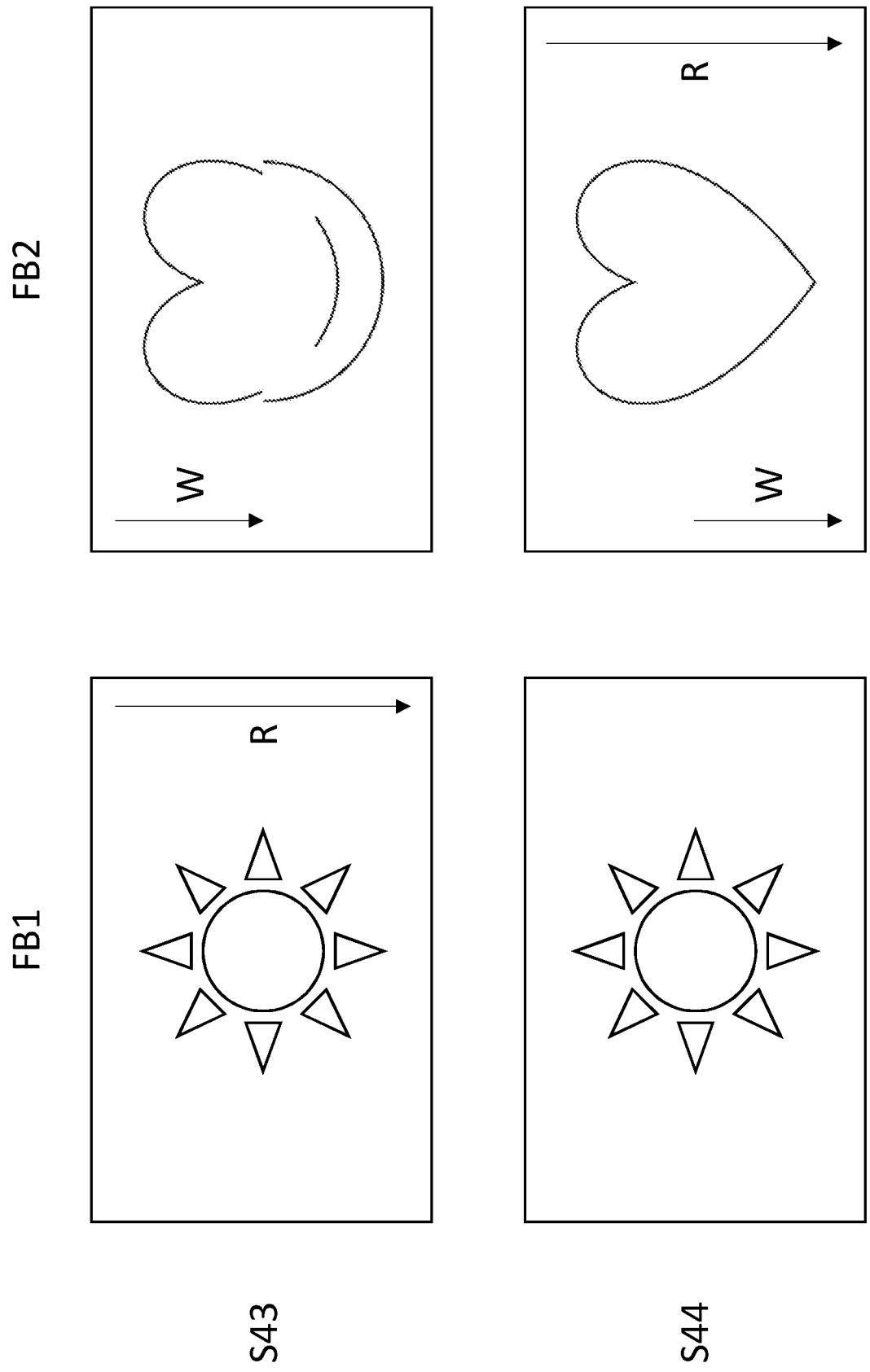
FIG. 4 shows an example with a first write process rate.

When the write process has completed the first frame buffer [18/FB1], it moves to the second frame buffer [18/FB2] at Step S43 of FIG. 4b to begin writing a new frame. This corresponds to a return to Step S32 of FIG. 3.

As previously described with regard to the first frame buffer [18/FB1] at Step S41, the write process writes the first half of the new frame (a heart) into the second frame buffer [18/FB2]. Meanwhile, the read process is carried out a second time on the first frame buffer [18/FB1], which is complete so there can be no tearing. As previously described, when the write process has written the first half of the frame buffer [18/FB2] (Step S33) the decoder sends a signal to the output engine [19] (Step S34) and the output engine [19] begins to read the second frame buffer [18/FB2] at Step S44, corresponding again to step S35 of FIG. 3. As previously described, while the read process is being carried out on the second frame buffer [18/FB2] the write process continues and completes the frame and the read process cannot overtake it because the time the read process begins is determined based on the relative speeds of the two processes.

When the write process has finished writing the data into the second frame buffer [18/FB2], it returns to the first frame buffer [18/FB1] and the process is repeated from Step S41, corresponding once again to Step S32.

The signal that triggers the transition of the read process between frame buffers [18/FB1/18/FB2] is described in FIG. 4b as being provided by the decoder [17]. However, it could also be an external signal from, for example, the display device [13] indicating that it expects a new frame, a clock signal, or any other suitable external or internal signal. The signal is independent of the progress of the read process through a buffer and therefore if there is a delay in the read process for any reason this delay is not propagated through the system; the read process can be sent to the beginning of the ready frame at any time, unlike in conventional systems where the read process must progress through all complete frames in order.

Figure 4C:
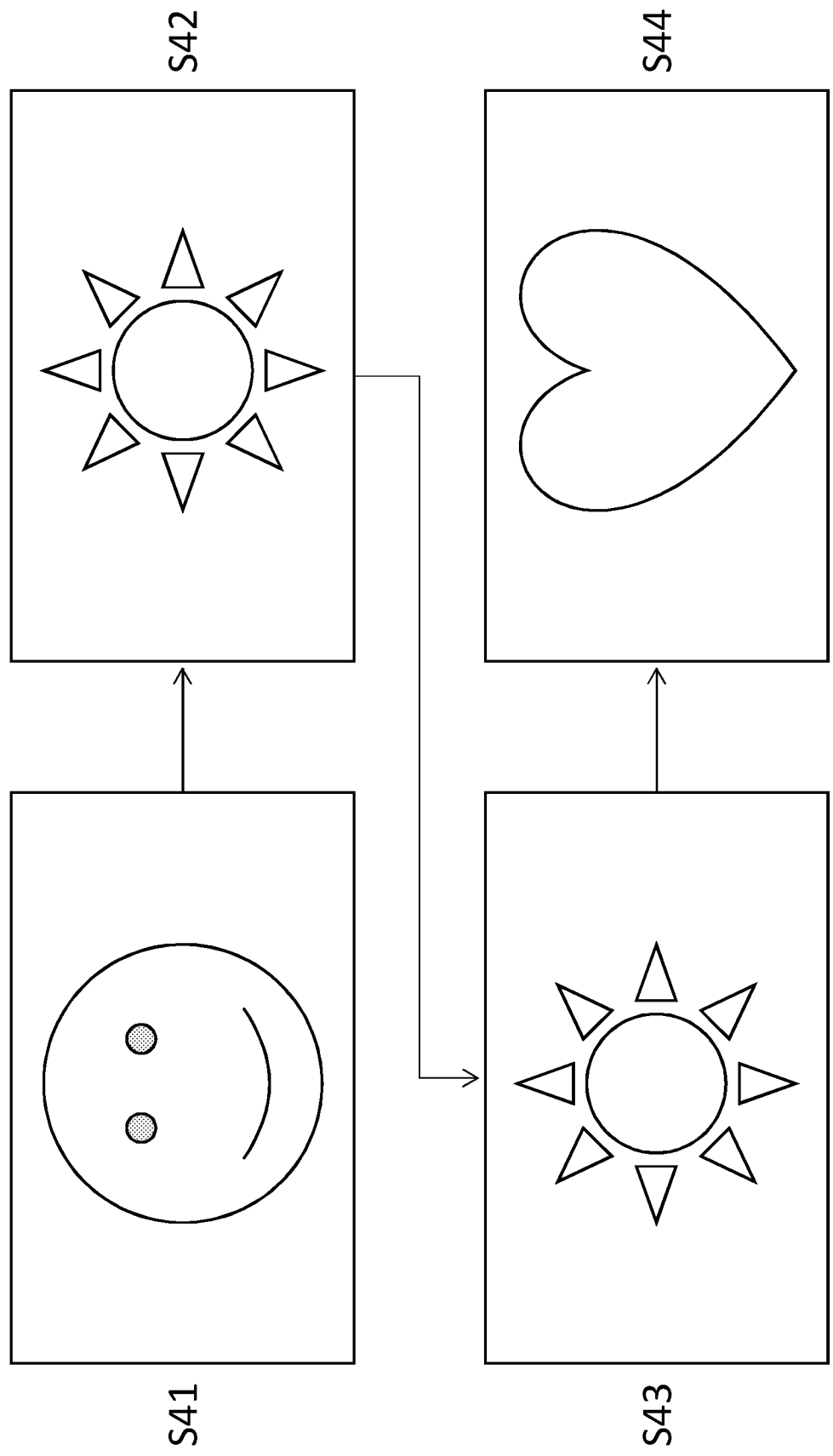

This version of the method will therefore result in an output on the display device such as that shown in FIG. 4c: at Step S41, the face is shown. The read process then transitioned to the first frame buffer [18/FB1] and therefore the sun is shown at Step S42. At Step S43 the read process read the first frame buffer [18/FB1] a second time and therefore the sun is shown again; this repetition occurs where the read process is faster than the write process. At Step S44, the read process once again transitioned to the second frame buffer [18/FB2] and therefore the heart is shown. It would be shown again in the next iteration and so forth.

The method is not restricted to a ratio of 2:1 between the rates of the read and write processes and can be extended to an arbitrary ratio. FIG. 5 shows a further iteration of the method where $$T_R = \frac{T_W}{3}$$

This means that the read process is three times faster than the write process. The frame buffer [18] therefore cannot be evenly divided as where the ratio between the rates of the read and write processes is 2:1. However, the predetermined stage can be calculated using the following proportion:

$$\text{Proportion} = 1 - 1\left(\frac{1}{3}\right)$$

i.e. ⅔ of the way through the buffer [18]. This could be calculated every time a new display session begins or could be hard-coded, for example at manufacture or into a display driver. In practice, "⅔ of the way through the buffer [18]" could be implemented based on data volume: for example, in a buffer which holds 3 GB of data, the read process may begin once 2 GB of data have been written:

$$\text{Portion} = 3GB - \frac{3GB}{3} = 2GB$$

or location in the frame: for example, if a frame includes 60 tiles, 40 tiles have been written:

$$\text{Portion} = 60 \text{ Tiles} - \frac{60 \text{ Tiles}}{3} = 40 \text{ Tiles}$$

It will also be appreciated that the portion need not necessarily be a contiguous area of memory of the buffer. For example, when the read process is to begin after 40 tiles have been written, the 40 tiles may be any combination of the tiles to be written to the buffer. Moreover, whilst in the above examples the read process has been described as starting once the write process completed writing to a determined proportion of the frame buffer, size of the frame buffer, or number of tiles, the method may instead calculate a time at which the read process is to begin based on the ratio of $T_R$ to $T_W$, such that the read process will not overtake the write process, and the read process may begin at the calculated time irrespective of how much data the write process has actually written to the buffer.

At Step S51, corresponding to Step S32 as previously described, the decoder [17] writes data (a sun) into the first third of the first frame buffer [18/FB1] while the output engine [19] reads the whole of the second frame buffer [18/FB2], in this example containing an existing frame (a face). At Step S52, the decoder [17] continues to write the second third of the frame into the first frame buffer [18/FB1] while the output engine [19] reads the whole of the second frame buffer [18/FB2] again.

At the end of Step S52, two thirds of the frame buffer [18/FB1] have been written and therefore the write process has reached the predetermined stage at Step S33 of FIG. 3. The decoder [17] therefore sends a signal to the output engine [19] to begin reading the first frame buffer [18/FB1] at Step S34 and the output engine [19] begins to read the first frame buffer [18/FB1] at Step S53 in FIG. 5b, corresponding to Step S35. As previously described, in the time it takes for the read process to complete in the first frame buffer [18/FB1], the write process has written the remainder of the frame into the first frame buffer [18/FB1].

At Step S54, corresponding to a return to Step S32, the decoder [17] begins writing the next frame (a heart) into the second frame buffer [18/FB2] while the output engine [19] reads the first frame buffer [18/FB1] a second time. The output engine [19] reads the first frame buffer [18/FB1] a third time at Step S55 of FIG. 5c, while the write process writes the second third of the new frame into the second frame buffer [18/FB2]. At the end of this stage the predetermined point has been reached, corresponding to Step S33, and therefore a signal is sent to the output engine [19] (Step S34) to indicate that it should begin reading the second frame buffer [18/FB2], which it does at Step S56, corresponding to Step S35. During Step S56, the decoder [17] also finishes writing the frame into the second frame buffer [18/FB2], as previously described.

Figure 5B:
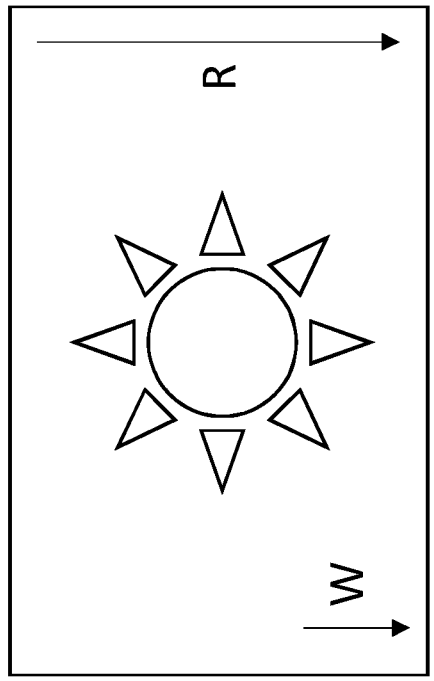
FIG. 5 shows an example with a second write process rate.
Figure 5B:
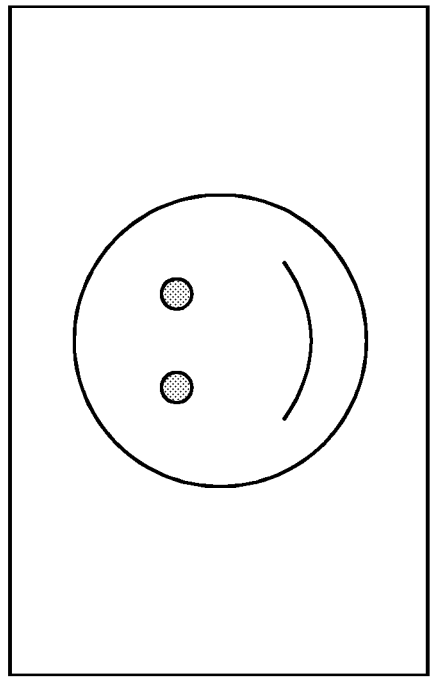
Figure 5B:
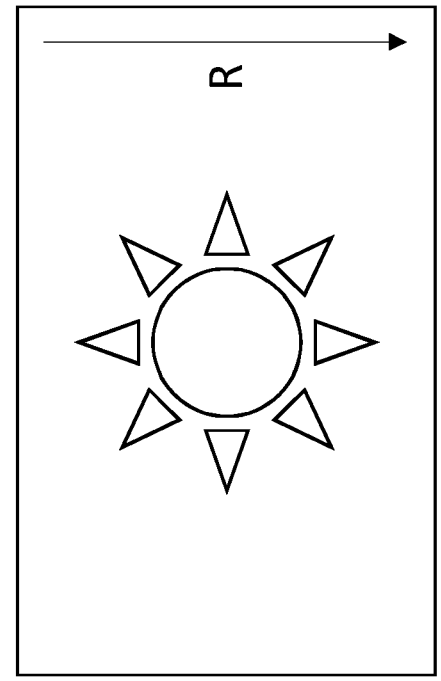
Figure 5B:
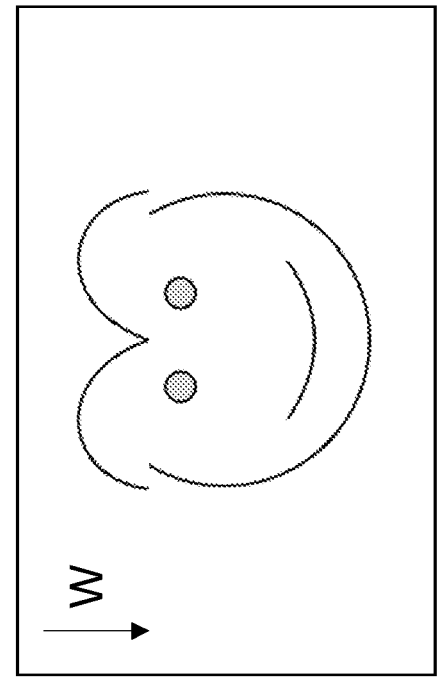
Figure 5C:
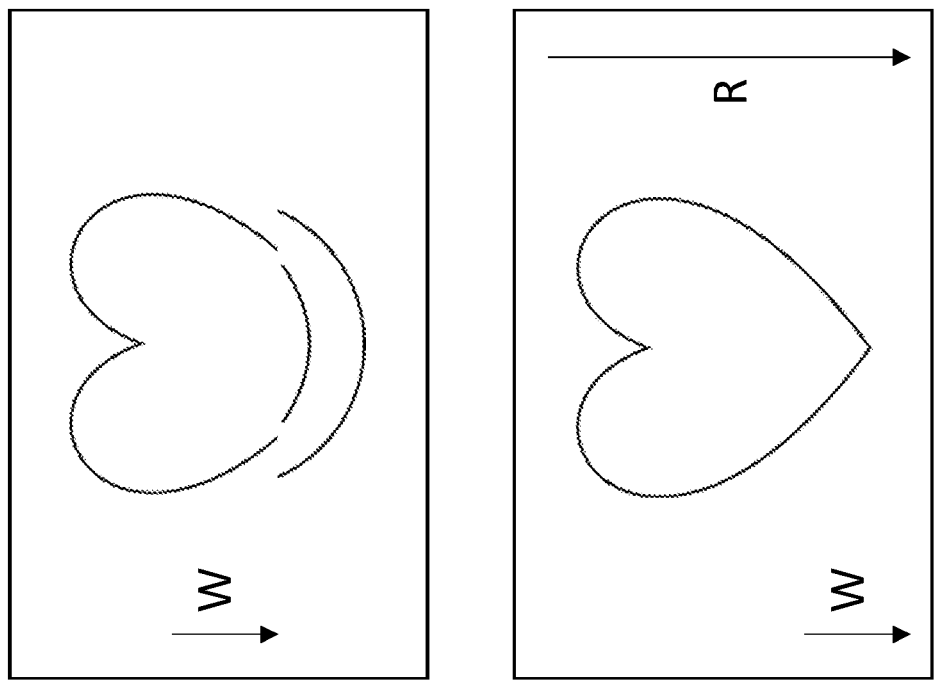
Figure 5C:
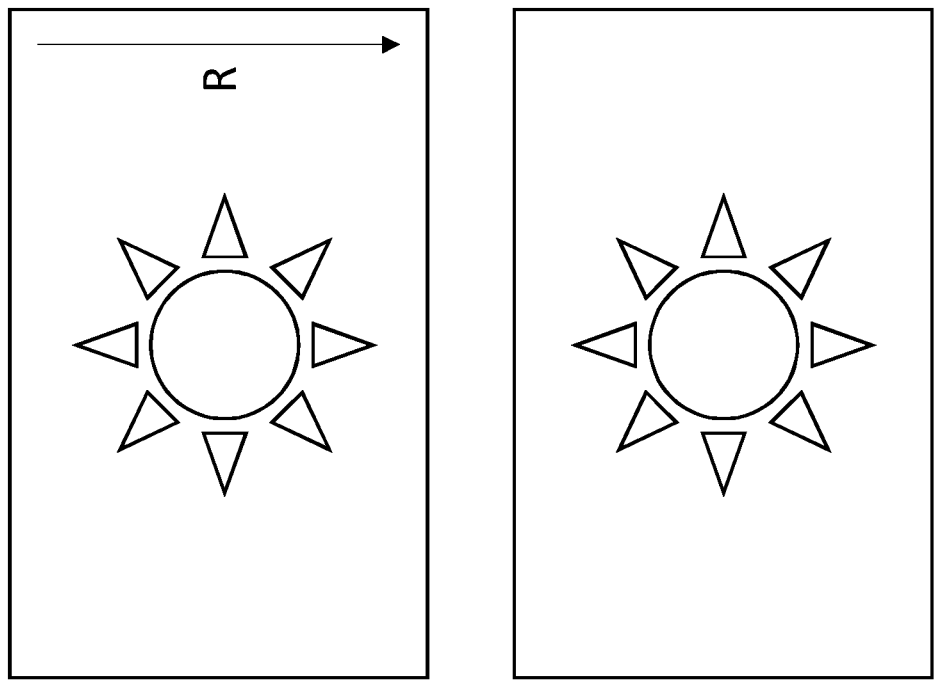
Figure 5D:
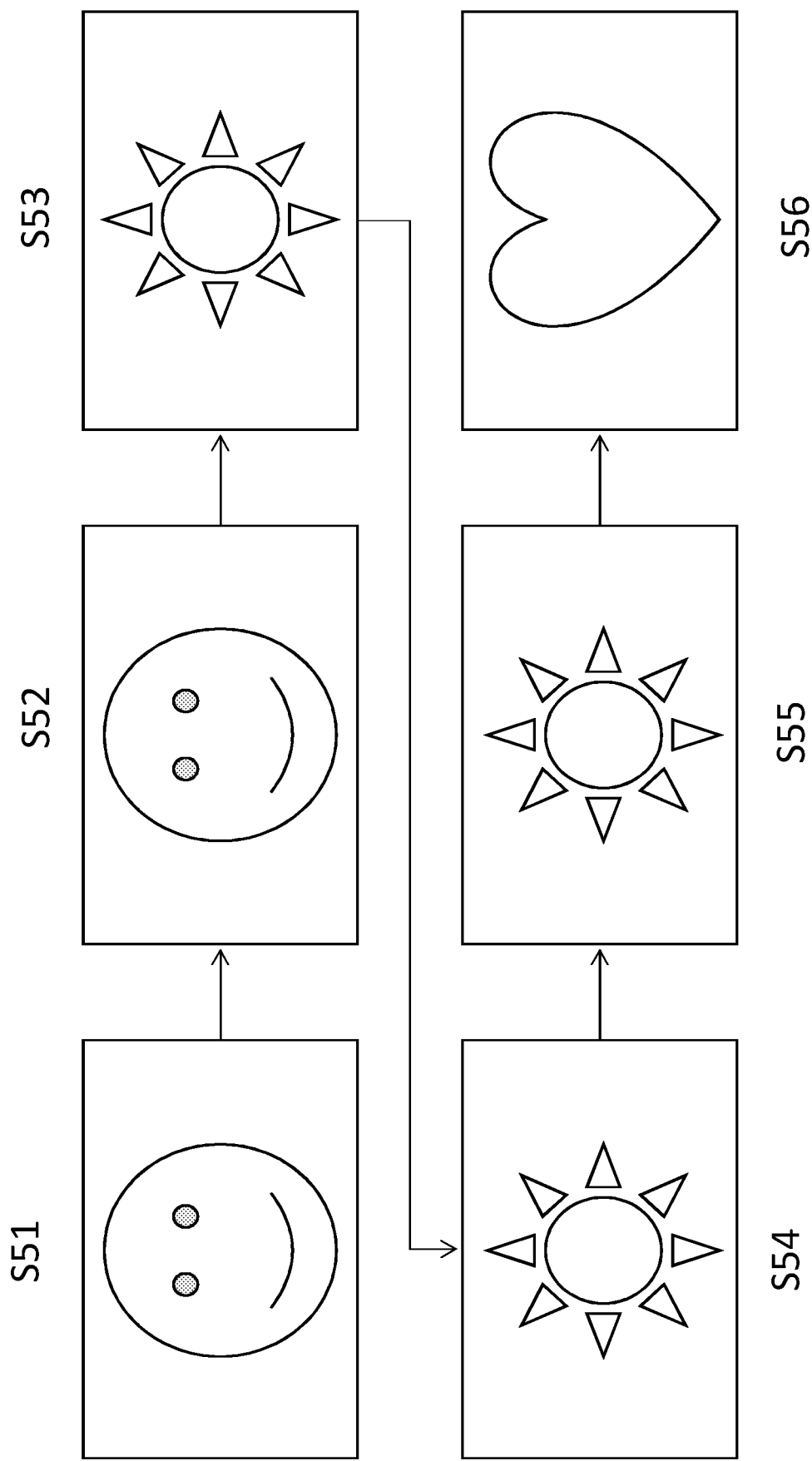

The resulting output is shown in FIG. 5d: at Step S51 the initial frame from the second frame buffer [18/FB2], the face, is shown. It persists at Step S52 before the output engine [19] transitioned to reading from the first frame buffer [18/FB1] at S53 and the sun is therefore shown. The output engine [19] continued reading from the first frame buffer [18/FB1] at Steps S54 and S55 while the decoder [17] wrote the first two-thirds of the frame into the second frame buffer [18/FB2], and then the output engine [19] transitioned to reading from the second frame buffer [18/FB2] and the heart is displayed at Step S56. As before, this results in repetition, because of the nature of a system where the read process is faster than the write process.

The above description assumes that the entire frame is updated. However, in some systems only part of the data may be updated at a time, for example only parts of a frame of display data that have changed compared to a previous frame, known sometimes as "dirty rectangles". This means that the volume and location of data written to the frame buffer may change from frame to frame. While the write process could still scan down the frame buffer in the conventional way and only make updates in the appropriate locations, acting with regard to the read process as described above, it may be more efficient for the write process to only access and update the appropriate locations and for the read process to begin as soon as possible for this limited write, as opposed to the full write.

In many conventional systems, the read process will still read the full buffer regardless of which parts have been updated and therefore $T_R$ will be fixed. However, the time required to write the updates to the buffer will depend on how much of the buffer has been updated. This information is known to the write process and can be used to determine when to begin the read process.

For example, if the buffer is split into N rows of data to be read in a range from 0 to N-1, read in order, the time at which a given row n is read can be described as $t_{r,n}$, which can be determined by a formula:

$$t_{r,n} = t_{r,0} + \frac{(n-1)T_R}{N}$$

I,e, the time at which row n is read is the time at which the read process started plus a time offset based on the value of n and the time required to read the whole buffer, divided by the number of rows in total.

Assuming that an updated part consists of M rows of data to be written in a range from 0 to M-1, written in order, the time at which the write function has completed a given row m can be described as $t_{w,m}$, which can be determined by a similar formula:

$$t_{w,m} = t_{w,0} + \frac{(m+1)T_W}{N}$$

I,e, the time at which the write process finishes writing row m is the time at which the write process started plus a time offset based on the value of m and the time required to write the whole buffer, divided by the number of rows in total.

The M rows in the updated part may in fact be split into multiple updated parts, and even a single updated part may not begin at the beginning of the buffer. Accordingly, it is necessary to map each row m to a row n in the buffer depending on the locations of the rows in the buffer:

$$n = f(m)$$

I.e. each updated row in the updated part is associated with a row in the buffer.

The time at which the read process begins is then selected such that, as an approximation:

$$t_{r,0} + \frac{(f(m)+1)T_R}{N} \geq t_{w,m}$$

So in an example where:
m=0
f(m)=n=3
N=8
$T_R$=X
$T_W$=2x $$t_{r,0} + \frac{(3+1)x}{8} \geq t_{w,0} + \frac{(0+1)2x}{8}$$

Thus $$t_{r,0} + \frac{x}{2} \geq t_{w,0} + \frac{x}{4}$$

Naturally, this inequality must be determined for every value of m in the updated part or all updated parts to produce a final value.

The time at which the read process begins can then be selected in order to preserve this inequality; there need no longer be a precise ratio maintained between the size of the portion of the buffer that has been updated and the time at which the read process begins. This calculation may be carried out on a per-frame basis by the device that determines the time at which the read process begins as previously described—in the examples above, the decoder [17].

Accordingly, under these circumstances, the Portion used in the methods may be reduced if it is known that the write process is not writing the entire frame; for example, if it were known that only the second half of a frame in the system described in FIG. 4 were being updated, the read process could begin at the same time as the write process as the case would essentially be those shown in Steps S42 and S44. The use of this method may reduce predictability of the system, but it may also reduce the latency caused by double-buffering and allow the system to be efficiently used with partial updates.

Figure 6:
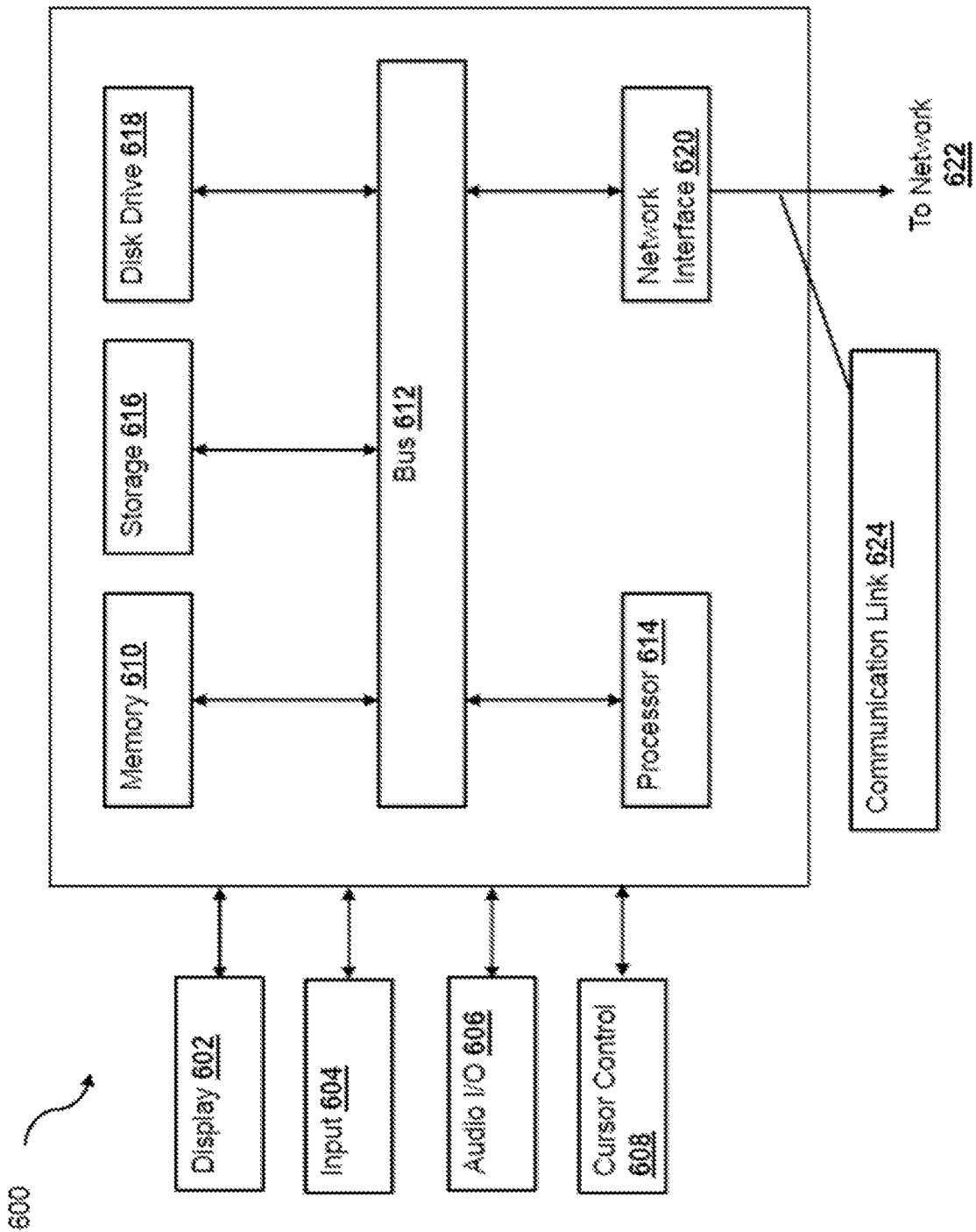
FIG. 6 shows a block diagram of a computer system.

FIG. 6 is a block diagram of a computer system [600] suitable for implementing one or more embodiments of the present disclosure, including the host device [11], or the display control device [12]. In various implementations, the host device [11] may include a mobile cellular phone, personal computer (PC), laptop, wearable computing device, etc. adapted for wireless communication, and each of the host device [11] and the display control device [12] may include a network computing device. Thus, it should be appreciated that these devices [12, 13] may be implemented as the computer system [600] in a manner as follows.

The computer system [600] includes a bus [612] or other communication mechanism for communicating information data, signals, and information between various components of the computer system [600]. The components include an input/output (I/O) component [604] that processes a user action, such as selecting keys from a keypad/keyboard, selecting one or more buttons or links, etc., and sends a corresponding signal to the bus [612]. The I/O component [604] may also include an output component, such as a display [602] and a cursor control [608] (such as a keyboard, keypad, mouse, etc.). An optional audio input/output component [606] may also be included to allow a user to use voice for inputting information by converting audio signals. The audio I/O component [606] may allow the user to hear audio. A transceiver or network interface [620] transmits and receives signals between the computer system [600] and other devices via network [622]. In one embodiment, the transmission is wireless, although other transmission mediums and methods may also be suitable. A processor [614], which can be a micro-controller, digital signal processor (DSP), or other processing component, processes these various signals, such as for display on the computer system [600] or transmission to other devices via a communication link [624]. The processor [614] may also control transmission of information, such as cookies or IP addresses, to other devices.

The components of the computer system [600] also include a system memory component [610] (e.g., RAM), a static storage component [616] (e.g., ROM), and/or a disk drive [618] (e.g., a solid-state drive, a hard drive). The computer system [600] performs specific operations by the processor [614] and other components by executing one or more sequences of instructions contained in the system memory component [610]. For example, the processor [614] could be utilised to perform the functions of the application [14] of the host device [11].

Executable logic for performing any described functions may be encoded in a computer readable medium, which may refer to any medium that participates in providing instructions to the processor [614] for execution. Such a medium may take many forms, including but not limited to, non-volatile media, volatile media, and transmission media. In various implementations, non-volatile media includes optical or magnetic disks, volatile media includes dynamic memory, such as the system memory component [610], and transmission media includes coaxial cables, copper wire, and fiber optics, including wires that comprise the bus [612]. In one embodiment, the logic is encoded in non-transitory computer readable medium, such as a magnetic or optical disk or other magnetic/optical storage medium, or FLASH or other solid-state memory (e.g. integrated into a device or in the form of a memory card). In one example, transmission media may take the form of acoustic or light waves, such as those generated during radio wave, optical, and infrared data communications.

In various embodiments of the present disclosure, execution of instruction sequences to practice the present disclosure may be performed by the computer system [600]. In various other embodiments of the present disclosure, a plurality of computer systems [600] coupled by the communication link [624] to the network (e.g., such as a LAN, WLAN, PTSN, and/or various other wired or wireless networks, including telecommunications, mobile, and cellular phone networks) may perform instruction sequences to practice the present disclosure in coordination with one another.

The above embodiments and examples are to be understood as illustrative examples. Where applicable, various embodiments provided by the present disclosure may be implemented using hardware, software, or combinations of hardware and software. Also, where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems including one or more memories storing various information described herein and one or more processors coupled to the one or more memories and a network, wherein the one or more processors are operable to perform steps as described herein, as non-transitory machine-readable medium including a plurality of machine-readable instructions which, when executed by one or more processors, are adapted to cause the one or more processors to perform a method including steps described herein, and methods performed by one or more devices, such as a hardware processor, user device, server, and other devices described herein.

The invention claimed is:

1. A method of writing data to, and reading data from, one or more buffers, the method comprising:
    determining a first write rate associated with writing data into a first buffer, wherein only updated parts of the first buffer are written to;
    determining a first read rate associated with reading data from the first buffer;
    determining a portion of the first buffer associated with the first write rate and the first read rate, wherein the portion of the first buffer is determined such that the reading of data from the first buffer does not overtake the writing of data into the first buffer;
    writing data into the portion of the first buffer;
    reading data from the first buffer responsive to completing the writing of data to the portion of the first buffer;
    writing data into a remaining part of the first buffer, different from the portion of the first buffer; and
    wherein determining the portion of the first buffer comprises determining a starting time for beginning to read the data from the first buffer such that $t_{r,0}+(f(m)+1)TR/N \geq t_{w,m}$, where $t_{r,0}$ is the time at which the zeroth row is read, $f(m)$ is a function mapping each m-th updated row of M updated rows to a corresponding row in the first buffer, $T_R$ is the time required to read the entire first buffer, N is the number of rows of data in the first buffer to be read, and $t_{w,m}$ is the time at which the m-th row is written to the first buffer.

2. The method of claim 1, wherein the first buffer is a first-in first-out (FIFO) buffer.

3. The method of claim 1, further comprising:
    determining a second write rate associated with writing data into a second buffer;
    determining a second read rate associated with reading data from the second buffer;
    determining a portion of the second buffer associated with the second write rate and the second read rate;
    writing data into the portion of the second buffer responsive to completing the writing of data to the remaining part of the first buffer, the reading of data from the first buffer being performed concurrently with the writing of data to the portion of the second buffer;
    reading data from the second buffer responsive to completing the writing of data to the portion of the second buffer;
    writing data into a remaining part of the second buffer, different from the portion of the second buffer; and
    wherein the portion of the second buffer is determined such that the reading of data from the second buffer does not overtake the writing of data into the second buffer.

4. The method of claim 3, wherein the second buffer is a FIFO buffer.

5. The method of claim 3, wherein the determining of the portion of the second buffer is based on a ratio of the second read rate and the second write rate.

6. The method of claim 1, wherein the determining of the portion of the first buffer is based on a ratio of the first read rate and the first write rate.

7. A method of writing data to, and reading data from, a buffer, the method comprising:
    determining a write rate associated with writing data into the buffer, wherein only updated parts of the buffer are written to;
    determining a read rate associated with reading data from the buffer;
    writing data into the buffer;
    determining, based on the write rate and the read rate, a time at which data is to be read from the buffer, wherein the time is determined such that the reading of data from the buffer will not overtake the writing of data into the buffer, wherein the time at which the data is to be read from the buffer is determined such that $t_{r,0}+(f(m)+1)TR/N \geq t_{w,m}$, where $t_{r,0}$ is the time at which the zeroth row of the buffer is read, $f(m)$ is a function mapping each m-th updated row of M updated rows to a corresponding row in the buffer, $T_R$ is the time required to read the entire buffer, N is the number of rows of data in the buffer to be read, and $t_{w,m}$ is the time at which the m-th row is written to the buffer; and
    reading data from the buffer at the determined time.

8. The method of claim 7, wherein the buffer is a first-in first-out (FIFO) buffer.

9. The method of claim 7, wherein:
    the time at which data is to be read from the buffer is calculated based on the time at which the writing of the updated parts to the buffer will be complete.

10. The method of claim 9, wherein all of the data in the buffer is read.

11. The method of claim 7, wherein the data comprises display data.

12. The method of claim 11, wherein the data comprises tiles of display data.

13. A system comprising:
    a non-transitory memory storing instructions; and
    one or more hardware processors coupled to the non-transitory memory and configured to execute the instructions from the non-transitory memory to cause the system to:
        determine a first write rate associated with writing data into a first buffer, wherein only updated parts of the first buffer are written to;
        determine a first read rate associated with reading data from the first buffer;
        determine a portion of the first buffer associated with the first write rate and the first read rate, the portion of the first buffer determined such that the reading of data from the first buffer does not overtake the writing of data to the first buffer;
        write data into the portion of the first buffer;
        read data from the first buffer responsive to completing the writing of data to the portion of the first buffer;
        write data into a remaining part of the first buffer, different from the portion of the first buffer; and
        wherein determining the portion of the first buffer comprises determining a starting time for beginning to read the data from the first buffer such that $t_{r,0}+(f(m)+1)TR/N \geq t_{w,m}$, where $t_{r,0}$ is the time at which the zeroth row is read, $f(m)$ is a function mapping each m-th updated row of M updated rows to a corresponding row in the first buffer, $T_R$ is the time required to read the entire first buffer, N is the number of rows of data in the first buffer to be read, and $t_{w,m}$ is the time at which the m-th row is written to the first buffer.

14. The system of claim 13, wherein the determining of the portion of the first buffer is based on a ratio of the first read rate and the first write rate.

15. The system of claim 13, wherein execution of the instructions further causes the system to:
- determine a second write rate associated with writing data into a second buffer;
- determine a second read rate associated with reading data from the second buffer;
- determine a portion of the second buffer associated with the second write rate and the second read rate;
- write data into the portion of the second buffer responsive to completing the writing of data to the remaining part of the first buffer, the reading of data from the first buffer being performed concurrently with the writing of data to the portion of the second buffer;
- read data from the second buffer responsive to completing the writing of data to the portion of the second buffer; and
- write data into a remaining part of the second buffer, different from the portion of the second buffer, wherein the portion of the second buffer is determined such that the reading of data from the second buffer does not overtake the writing of data into the second buffer.

16. The system of claim 15, wherein the determining of the portion of the second buffer is based on a ratio of the second read rate and the second write rate.

* * * * *